(12) United States Patent
Herrmann et al.

(10) Patent No.: US 10,891,245 B2
(45) Date of Patent: Jan. 12, 2021

(54) VIDEO DEVICE AND METHOD FOR EMBEDDED DATA CAPTURE ON A VIRTUAL CHANNEL

(71) Applicant: NXP USA, Inc., Austin, TX (US)

(72) Inventors: Stephan Matthias Herrmann, Markt Schwaben (DE); Naveen Kumar Jain, Panipat (IN); Shivali Jain, Narwana (IN); Shreya Singh, Ranchi (IN)

(73) Assignee: NXP USA, Inc., Austin, TX (US)

(*) Notice: Subject to any disclaimer, the term of this patent is extended or adjusted under 35 U.S.C. 154(b) by 70 days.

(21) Appl. No.: 15/982,057

(22) Filed: May 17, 2018

(65) Prior Publication Data

US 2019/0057051 A1 Feb. 21, 2019

(30) Foreign Application Priority Data

Aug. 18, 2017 (EP) .................................. 17186940

(51) Int. Cl.
| | |
|---|---|
| *G06F 13/16* | (2006.01) |
| *G06F 13/42* | (2006.01) |
| *G06F 3/00* | (2006.01) |
| *G06F 3/14* | (2006.01) |
| *H04N 7/18* | (2006.01) |

(52) U.S. Cl.
CPC .......... *G06F 13/1673* (2013.01); *G06F 3/005* (2013.01); *G06F 3/14* (2013.01); *G06F 13/4282* (2013.01); *H04N 7/18* (2013.01)

(58) Field of Classification Search
CPC ...... H04N 7/14–157; B60W 2420/403; B60W 2420/42; B60Y 2400/3015; G06F 17/30265; G06F 17/30268; G06F 17/3028; G08B 13/19671; G08B 13/19673

USPC .......... 348/14.01, 207.11, 383, 388.1, 385.1
See application file for complete search history.

(56) References Cited

U.S. PATENT DOCUMENTS

| | | | |
|---|---|---|---|
| 7,058,979 B1 | 6/2006 | Baudry et al. | |
| 7,254,378 B2 | 8/2007 | Benz et al. | |
| 8,184,164 B2* | 5/2012 | Yang | H04N 17/004 348/192 |
| 8,254,470 B2 | 8/2012 | Cloutman | |
| 2005/0175084 A1* | 8/2005 | Honda | H04N 21/23432 375/240.01 |
| 2008/0316298 A1* | 12/2008 | King | H04N 7/152 348/14.09 |
| 2013/0155036 A1* | 6/2013 | Kim | G09G 3/2092 345/204 |
| 2013/0290402 A1* | 10/2013 | Gavade | H04N 21/26258 709/203 |

(Continued)

OTHER PUBLICATIONS

Mipi, "DRAFT MPIP Alliance Specification for Camera Serial Interface 2 (CSI-2)," Draft Version 1.01.00 Revision 0.04, Apr. 2, 2009, 170 pages.

*Primary Examiner* — Xi Wang (57) ABSTRACT

A video device is described that includes: a host processor comprising at least one input video port configured to receive a plurality of video data signals that comprise video data and embedded data from a plurality of virtual channels in a received frame; and a memory operably coupled to the host processor and configured to receive and store video data. The host processor is configured to segregate the video data from the embedded data in the received frame and process the embedded data individually.

18 Claims, 6 Drawing Sheets

(56) References Cited

U.S. PATENT DOCUMENTS

2014/0184828 A1* 7/2014 Chartrand ............... G06F 3/005
                                                      348/207.11
2014/0247355 A1* 9/2014 Ihlenburg ................ H04N 7/18
                                                      348/148
2016/0212456 A1   7/2016 Bohm et al.

* cited by examiner

VIDEO DEVICE AND METHOD FOR EMBEDDED DATA CAPTURE ON A VIRTUAL CHANNEL

CROSS-REFERENCE TO RELATED APPLICATIONS

This application claims priority under 35 U.S.C. § 119 to European patent application no. EP 17186940.7, filed Aug. 18, 2017, the contents of which are incorporated by reference herein.

FIELD OF THE INVENTION

The field of the invention relates to a video device that processes video data and a method for embedded data capture on a virtual channel. The invention is applicable to, but not limited to, a video device for embedded data capture in a single buffer on a MIPI Alliance CSI-2 video data link.

BACKGROUND OF THE INVENTION

The Mobile Industry Processor Interface (MIPI) Alliance is a global, open-membership organization that develops interface specifications for the mobile ecosystem, including mobile-influenced industries. The MIPI Alliance co-ordinate technologies across the mobile computing industry, and the Alliance's focus is to develop specifications that ensure a stable, yet flexible technology ecosystem.

The Camera Serial Interface (CSI) is a specification of the MIPI Alliance. It defines an interface between a camera and a host processor. Vehicle-based applications that include a CSI include front camera advanced driver assistance systems (ADAS), whereby video data is processed to detect pedestrians, objects, issue lane departure warnings, smart head-beam control and traffic sign recognition. The MIPI CSI-2 standard allows concurrent video data reception from up to four virtual channels (VCs). A virtual channel represents a source (which in some instances may be a combination of multiple MIPI sensors), with data transferred on a virtual channel relating to video data from the one (or more) source(s). In the MIPI CSI-2 standard, VCs signify different video data sources. A combination of video sources may also represent one VC. The VCs use a single packet per high-speed (HS) frame, which includes a frame start/frame end, an optional line start/line end and a low power (LP) state between frames.

Figure 1:
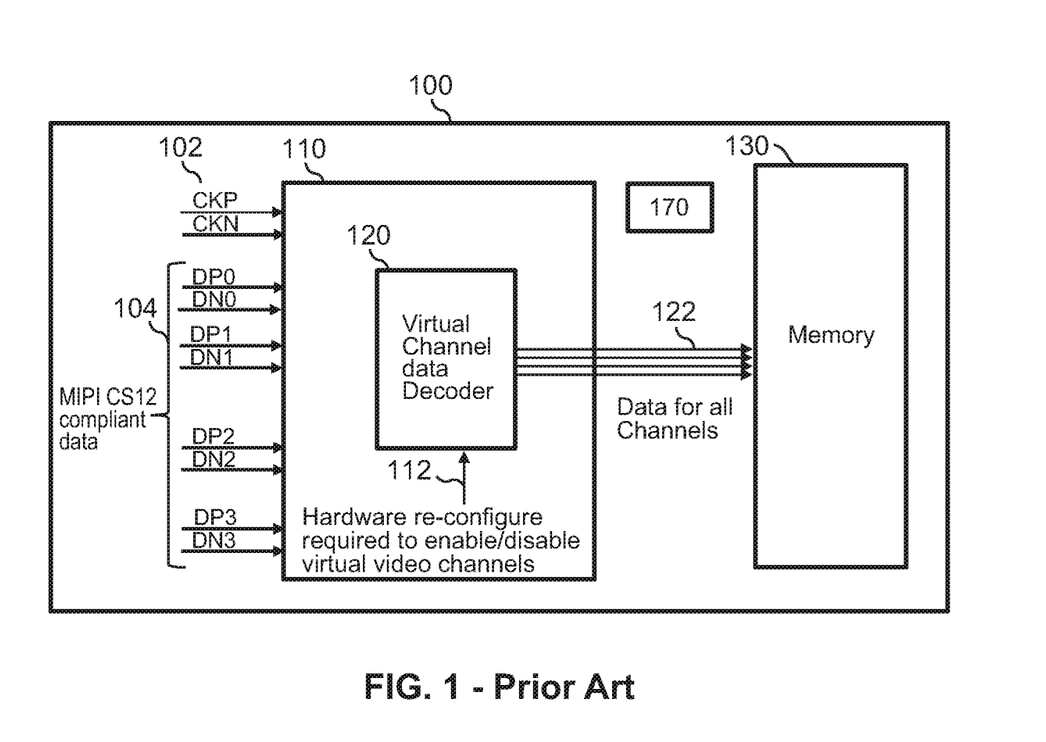
FIG. 1 illustrates a simplified known block diagram of a video device that supports the MIPI CSI-2 standard.

Referring now to FIG. 1, a simplified known block diagram of a video device 100 that supports the MIPI CSI-2 is illustrated. The video device 100 includes a camera input that provides a series of parallel virtual channel signals 104 to a microprocessor unit or host controller 110. In the illustration of FIG. 1, four paired virtual channels are shown DP0, DN0 and DP1, DN1 and DP2, DN2 and DP3, DN3. Here, 'P' and 'N' represent differential signalling. These differential signals include the high speed differential data from the MIPI transmitter to the host controller. The video device 100 also includes a clock input 102, which provides clock signals for the respective P and N MIPI CSI2 compliant video data signals, to the host processor 110. The host processor 110 includes a number of circuits, logic or components, one of which is a virtual channel data decoder 120 that is arranged to decode the video data received on each of the four paired virtual channels 104. The decoded video for all four paired virtual channels is then transferred 122 to memory 130, where all the data is stored. A hardware controller 170 within the video device 100 controls a majority of the functionality.

In an electronic unit, such as video device 100, that supports the MIPI CSI-2 standard, embedding extra lines containing additional information at the beginning and at the end of each picture frame, termed 'frame header' and 'frame footer', is supported. The MIPI CSI-2 standard further allows zeroes or more lines of embedded data at the start and end of each frame. Embedded data, in this context, is non image data and needs to be processed different from the video stream. A number of lines of embedded data within a frame would ideally be contained within a small range across each of the virtual channels. These lines of embedded data may not require processing on a per-frame basis and the MIPI CSI2 standard does not specify how the embedded data should be processed, or where and how this embedded data may appear in a MIPI CSI2 frame.

It is known that a use of embedded data varies greatly over different systems. The embedded data may be used by the end user for different applications, and the embedded data may vary as to the significance of the embedded information. The inventors have recognized and appreciated that storing video data in the same buffer as embedded data would unnecessarily lead to filling up the buffer for video data faster leading to a need to increase the overall system performance. The inventors have further recognized and appreciated that if a number of embedded data blocks received is not the same as expected by the software, or the buffer size defined by software is not large enough to accommodate all embedded data blocks within a frame, erroneous processing is likely to result.

U.S. Pat. No. 7,254,378 B2, describes a receiver system for decoding data embedded in an electromagnetic signal, and stipulates a use of separate decoders for embedded data and other relevant electromagnetic signals. U.S. Pat. No. 8,254,470 B2 describes encoding and decoding of an embedded data stream in analog video using copy protection pulses.

Thus, there is a need to better handle such embedded data for further processing, for example in a video device that supports the MIPI CSI-2 standard.

SUMMARY OF THE INVENTION

The present invention provides a video device, a vehicle including the video device and a method for embedded data capture, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Having recognized and appreciated that embedded data, if managed in a similar manner to video data and placed in the same buffer, may lead to unnecessary overhead, in that video device would need to keep track of different processing operations that may be needed for the different types of buffered data, the inventors of the present invention have proposed a design to segregate video data and embedded data in a received frame, in order to suit their respective processing requirements.

Additionally, the inventors of the present invention have proposed a design to separate buffer management for embedded data with software control to dynamically and intelligently provide overwriting or retaining embedded data when a new frame arrives. In this manner, an end-user dependent embedded data capture scheme is proposed, with programmability on the embedded buffer size, length, etc. that does not restrict the extent of embedded data use within video data.

In some examples, the inventors of the present invention have proposed a use of a single fixed buffer block for capture of embedded data across all virtual channels. In some examples, the use of a single fixed buffer block for capture of embedded data on multiple (or all) virtual channels may allow overwriting of existing data or retaining data based on rules employed by software programmability. When embedded data is being received for multiple virtual channels and being written to a single buffer in the memory, the amount of space allocated for the embedded data may be consumed as and when the embedded data is being written. When embedded data in newer frames are received, existing content in the buffer for embedded data may, or may not, be overwritten, for example based on software configuration. Therefore, in some examples, the proposed design may be configured to support software decision based retention of MIPI embedded data upon reception of new data frames. Also, in some examples, the design facilitates the generation of multiple triggers after programming the master virtual channel to contain a particular number of embedded data blocks, say at the start and/or end of frames on a MIPI CSI2 link. In this context, the software may be configured to program a number of blocks of embedded data that are expected at a start of a frame, after which an interrupt may or should be generated. In some examples, the software may also configure a number of blocks of embedded data at the end of a frame, after which a second trigger may or should be generated.

In some examples, the inventors of the present invention have proposed that the host processor tracks a number of embedded data blocks at the start and end of a received video frame. The proposed design also tracks the number of embedded bytes that are received, and preferably reports errors in cases of difference between received and expected amounts of embedded data. Furthermore, in some examples, the proposed design also intelligently supports or prevents data overwrites in the buffer and provides relevant information on the embedded data to determine whether the expected embedded data content is received. In this manner, the software is able to take the necessary action(s) or decision(s) to handle the embedded data, thereby increasing the reliability of embedded data capture.

A first aspect of the invention describes a video device that includes a host processor comprising at least one input video port configured to receive a plurality of video data signals that comprise video data and embedded data from a plurality of virtual channels in a received frame; and a memory operably coupled to the host processor and configured to receive and store video data. The host processor is configured to-segregate the video data from the embedded data in the received frame and process the embedded data individually. In this manner, a recognition that the content of embedded data is different from normal video data is exploited such that the data is segregated and different processing requirements may be employed. For example, the embedded data may no longer be subjected to a per-frame processing requirement, unlike video data that needs to be processed continuously. In some examples, the embedded data may be applied across a plurality or all virtual channels (VCs) in a similar manner to the video data content.

In some examples, the host processor may be further configured to create a single fixed buffer block for capture of embedded data across multiple virtual channels from the plurality of virtual channels. In this manner, the single fixed buffer may be employed for embedded data in isolation from the normal video data. In this example, the host processor may be further configured to select one of the plurality of virtual channels and program the selected virtual channel to function as a master virtual channel for carrying video data and a number of embedded data blocks.

In some examples, the host processor may be further configured to decide a frame start position on which each virtual channel would start embedded data capture. In some examples, the host processor may be configured to determine how many embedded data blocks are to be expected at a start of a received frame and expected at an end of the received frame based on the number of programmed embedded data blocks. In this manner, the segregation of the embedded data from the video data may be used by the host processor to identify more easily the location of the embedded data on the VCs.

In some examples, the host processor may be configured to manage a set of status registers, wherein the set of status registers identify a next pointer indication in the memory for writing embedded data to and use a determined frame start and a frame end position to identify a total number of embedded data blocks received in a received frame. In this manner, a control of embedded data locations in the memory, and the potential for over-writing data within the memory, can be managed.

In some examples, the memory contains software-configurable registers and the host processor may be configured to determine whether or not embedded data is to be overwritten in the software-configurable registers contained in the memory using an embedded Auto clear flag.

In this manner, a control of embedded data locations in the memory, and the potential for over-writing data within the memory, can be managed.

In some examples, a controller may be operably coupled to the host processor wherein the host processor may be configured to inform the controller when a received frame contains an expected number of embedded data blocks or when a difference exists between a received number of embedded data blocks and an expected number of embedded data blocks in a received frame. In some examples, the controller may be configured to generate at least one interrupt in response to the host processor identifying a received frame having an expected number of embedded data blocks at the start and/or end of the received frame. In some examples, the controller may be configured to record in memory at least one of: a next line pointer, an error status bit, a received number of blocks, in response to the host processor identifying a received frame having an unexpected number of embedded data blocks at the start and/or end of the received frame. In some examples, the at least one of: a next line pointer, an error status bit, a received number of blocks, remain stored in memory until a next embedded data capture process starts on the master virtual channel.

A second aspect of the invention describes a vehicle having a video device that includes: a host processor comprising at least one input video port configured to receive a plurality of video data signals that comprise video data and embedded data from a plurality of virtual channels in a received frame; and a memory operably coupled to the host processor and configured to receive and store video data. The host processor is configured to-segregate the video data from the embedded data in the received frame and process the embedded data individually.

A third aspect of the invention describes a method of processing video data in a video device that includes a host processor. The method includes: receiving a plurality of video data signals that comprise video data and embedded data from a plurality of virtual channels in a received frame; and storing the video data from the plurality of virtual channels. The method further includes segregating the video data from the embedded data in the received frame; and processing the segregated embedded data separately.

Figure 2:
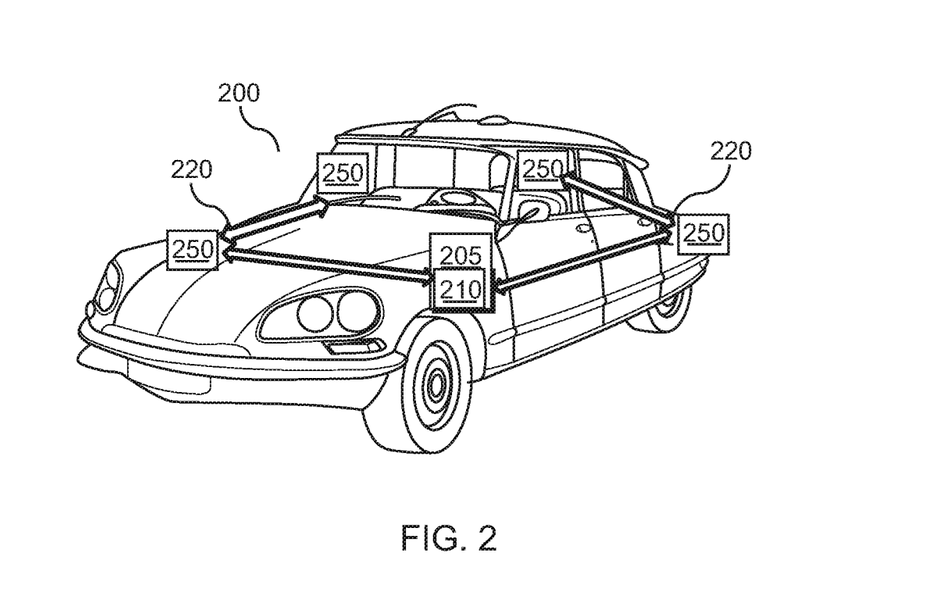
FIG. 2 illustrates a simplified diagram of a vehicle employing a camera system that supports the MIPI CSI-2 standard, according to example embodiments of the invention.

Referring now to FIG. 2, a simplified diagram of a vehicle 200 employing a camera system 205 that includes a host processor 210 is illustrated, according to example embodiments of the invention. In this example, the host processor 210 is operably coupled to the plurality of cameras 250 attached to the vehicle, via, say, an integrated communication bus network 220. In examples of the invention, the host processor 210 is configured to segregate video data and embedded data in a received frame from each of the plurality of cameras 250, in order to suit their respective processing requirements.

In some examples, a single fixed buffer block is used for capture of embedded data for multiple (or all) virtual channels. In some examples, the use of a single fixed buffer block for capture of embedded data for multiple (or all) virtual channels may allow overwriting of existing data or retaining data based on rules employed by software programmability. In this context, it is envisaged that software may not have processed the embedded data completely by the time that a new frame arrives, so retention would be needed. In cases where the information carried by the embedded packets is not of interest to be processed continuously, and overwriting would not cause any loss, or there is repeated information in the embedded packets over frames or software that is processing embedded data at a similar pace to the arrival of such content, the same location may be reused on the arrival of fresh embedded data. Additionally, the host processor 210 is configured to separate buffer management for embedded data with software control, e.g. control by host processor 210, on overwriting or retaining embedded data when a new frame arrives. In this manner, an end-user dependent embedded data capture scheme is proposed, with programmability on the embedded buffer size, length, etc. that does not restrict the extent of embedded data use within video data. In some examples, the design supports decision-based retention of MIPI embedded data upon reception of new data frames, as applied by host processor 210.

Also, in some examples, the design facilitates the generation of multiple triggers after programming a particular number of embedded data blocks, say at the start and/or end of frames on a MIPI CSI2 link.

In some examples, the host processor 210 is configured to track a number of embedded data blocks at the start and end of a video frame, as well as the number of embedded bytes received, and preferably reports errors in a case of a difference between the number of received and expected embedded data blocks. Furthermore, in some examples, the host processor 210 may also be configured to prevent data overwrites in the buffer and/or provides useful and relevant information on the embedded data to a controller to determine whether the expected embedded data content is received. In this manner, the host processor 210 is able to take the necessary action(s) or decision(s) to handle the embedded data, thereby increasing the reliability of embedded data capture.

Although examples of the invention are described with reference to a vehicle 200 such as a car, as illustrated in FIG. 2, it is envisaged that any road transport device may use the concepts herein described, such as trucks, motorcycles, buses, etc.

Figure 3:
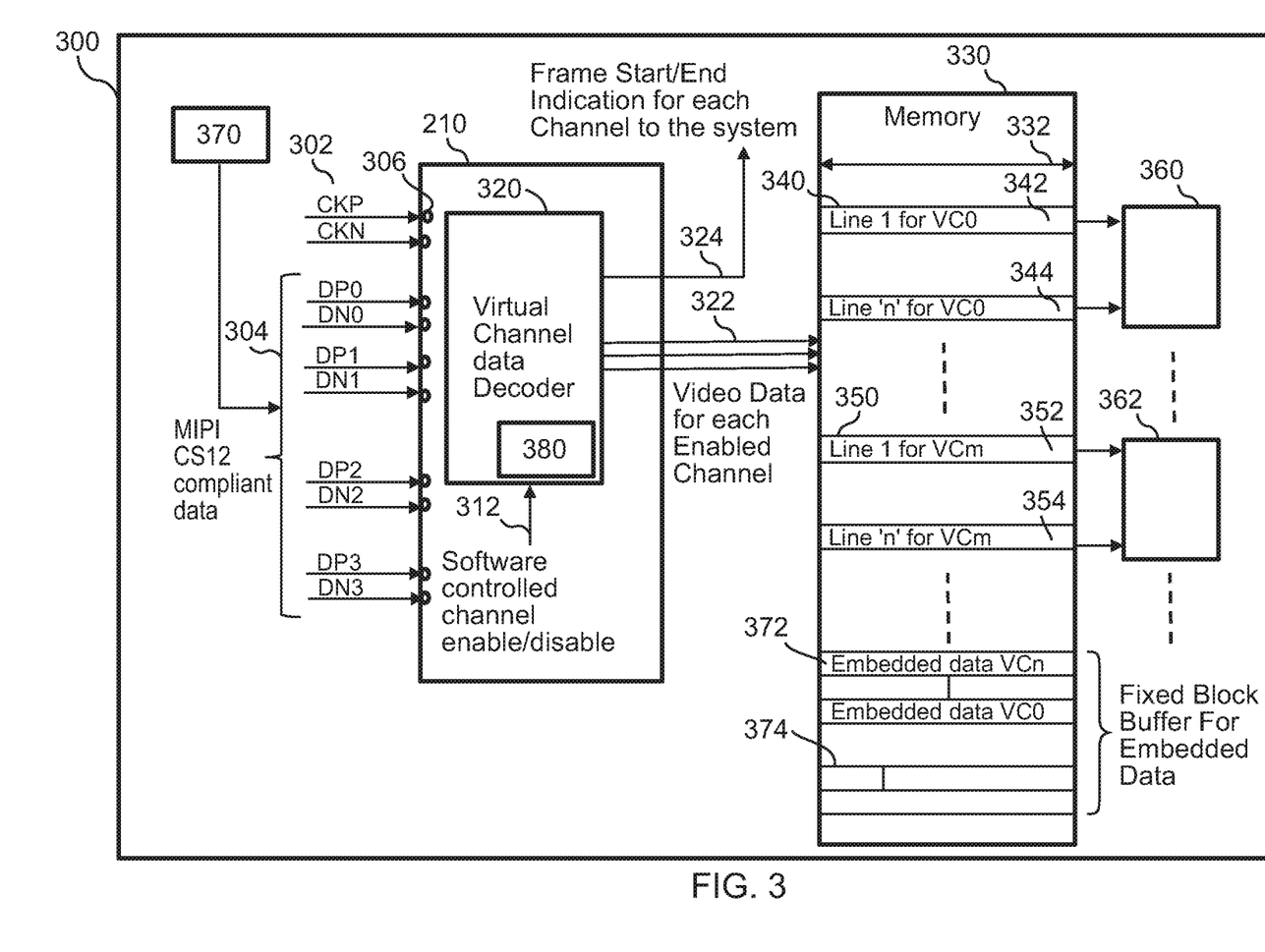
FIG. 3 illustrates a simplified diagram of a video device that supports the MIPI CSI-2 standard, according to example embodiments of the invention.

Referring now to FIG. 3, a simplified diagram of a camera system with a video device that supports the MIPI CSI-2, according to example embodiments of the invention, is illustrated. The video device 300 includes a camera input that provides a set of parallel virtual channel signals 304 to a host processor 210, which may be in a form of a microprocessor unit or host controller. In the illustration of FIG. 3, four paired virtual channels are shown DP0, DN0 and DP1, DN1 and DP2, DN2 and DP3, DN3. In other examples, more or fewer virtual channels and cameras may be used. The video device 300 also includes a clock input 302, which provides clock signals for decoding the respective 'P' and 'N' MIPI CSI2 compliant video data signals, in the host processor 210.

The host processor 210 includes at least one input video port 306 (and in this illustrated case multiple video input ports) configured to receive a plurality of video data signals that comprise video data and embedded data from a plurality of virtual channels in a received frame The host processor 210 includes a number of circuits, logic or components, one of which is a virtual channel data decoder 320 that is arranged to decode the video data received on each of the four paired virtual channels 304. The virtual channel data decoder 320 uses the clock signals to correctly and simultaneously decode the video data received on each of the four paired virtual channels 304. The decoded video data 322 for those selected paired virtual channels from the four paired virtual channels is then relayed to memory 330 where the selected video data is stored.

In accordance with examples of the invention, host processor 210 is adapted to configure a set of software-configurable registers in memory 330. In particular, in one example, the host processor 210 configures a start pointer location for a fixed buffer, to align the storing and extracting of a selected number of video frames into and out of the memory 330. In one example, the host processor 210 is also arranged to determine an embedded data length that identifies an expected amount of embedded data in terms of number of bytes. In this example, the host processor 210 is also arranged to select which embedded channels are enabled, thereby allowing a selection of virtual channels for which embedded data is to be captured. In some examples, the host processor 210 is also arranged to decide whether (or not) embedded data would be overwritten in the software-configurable registers in memory, for example using an embedded Auto clear flag.

In accordance with some examples of the invention, host processor 210 is adapted to select one of the virtual channels to function as a master channel for carrying embedded data for multiple virtual channels, and decide a frame start position on which each virtual channel would start embedded data capture. In some examples, the host processor 210 may be adapted to determine how many embedded data blocks are to be expected at a start of frame and expected at an end of the frame. In this context, one or more lines of embedded data may be provided on one or more VCs 370, 372, and the master channel may identify a certain point in time from which embedded data capture may start in a fixed block buffer. For instance, if VC0 372 is the master channel, once frame start on VC0 372 occurs, embedded data capture in the fixed block buffer may also start. Now, if the first embedded data to appear is located on VC2, and this comes after the frame start on VC0 372, the embedded data will be captured in the memory. However, if the embedded data appears before the frame start on VC0 372, the embedded data would not be captured. Essentially, embedded data may appear on any or all of the virtual channels, and the master channel frame start is configured to provide an indication of when such capture starts.

In accordance with some examples of the invention, the virtual channel data decoder 320 is adapted to manage a set of status registers 380 that are configured to provide information on the current operational conditions of the camera system. For example, the set of status registers 380 may describe a next pointer indication of the embedded data (e.g. indicating a next location in memory 330 where embedded data would be written). In another example, the set of status registers 380 may, for example using a determined frame start and a frame end position, identify a total number of embedded data blocks received so far.

In accordance with some examples of the invention, controller 370 may be configured to support an interrupt enable process for allowing interrupt generation when an expected number of embedded data blocks have been received at the start and/or end of frame, as determined by the host processor 210.

The memory 330, which in some examples is a system random access memory (RAM) has a buffer length 332 that can accommodate a line of video data, where a plurality of lines from line '1' 342 to line 'n' 344 are being provided to constitute a video frame. In the illustrated example, data from a first virtual channel (VC0) 340 is stored in this section of memory 330. Similarly, video data for a second selected virtual channel (VCm) 350 is stored between a different section of memory 330 between respective line '1' 352 to line 'n' 354.

At some time later, the stored/buffered video data is output (or extracted) from memory 330 by one or more image signal processor(s) 360, 362. In the illustrated example, an image signal processor is allocated on a per virtual channel basis. In this context, the one or more image signal processor(s) 360, 362 may be considered as a hardware accelerator that would process the captured video data, e.g. by filtering.

In some examples, it is envisaged that the video device may be locatable in a vehicle, such as vehicle 200 in FIG. 2. In this application, a four channel MIPI CSI-2 system may be employed to support a surround view function. For example, a surround view would facilitate having a 360 degree view around the vehicle 200 with multiple cameras 250 (e.g. one case could be four cameras, one rear, one front and one on each side of the vehicle 200). Such video monitoring may be used in many vehicular applications such as parking assist, etc.

Figure 4:
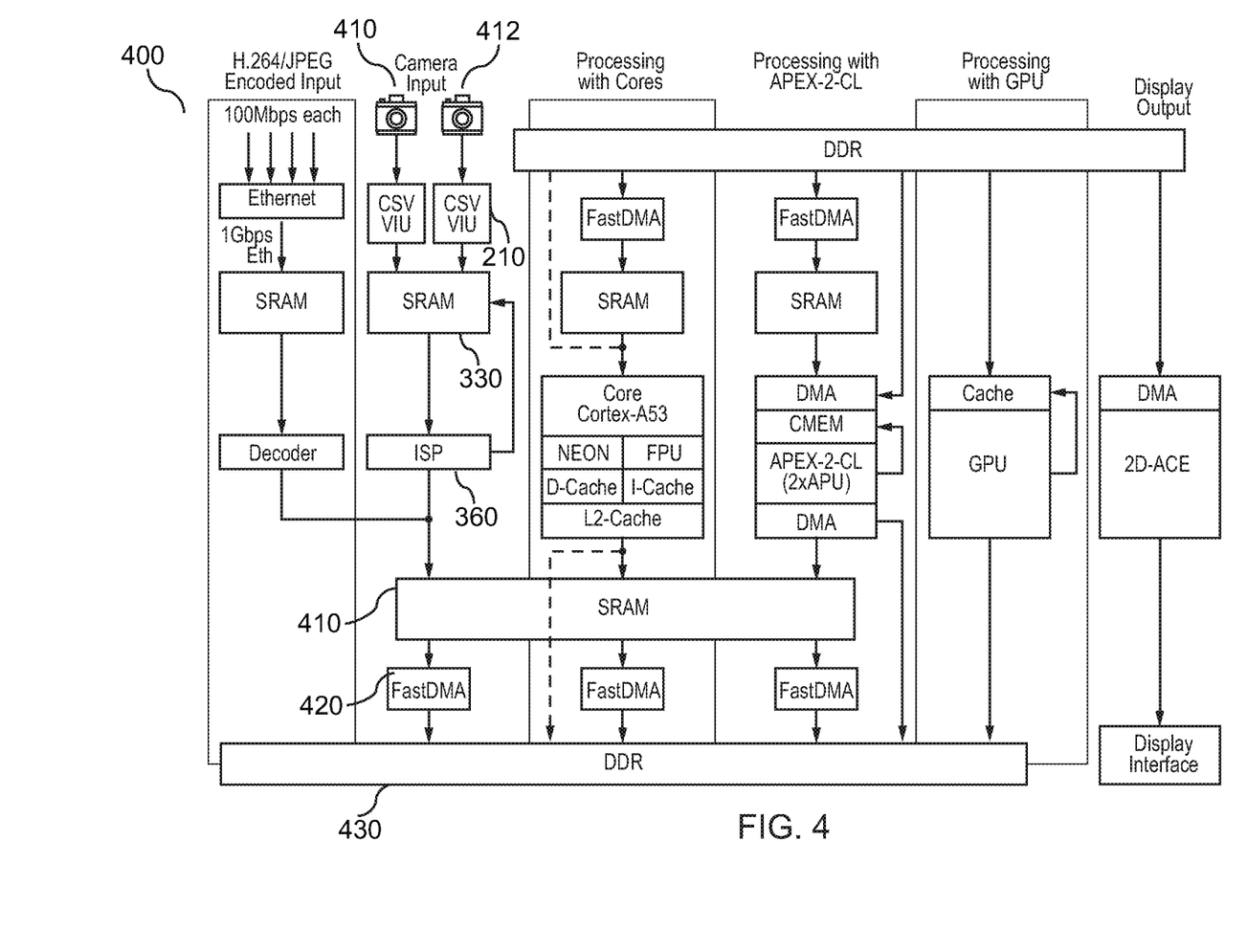
FIG. 4 illustrates a simplified block diagram of a camera system that supports the MIPI CSI-2 standard, according to example embodiments of the invention.

FIG. 4 illustrates a simplified block diagram of a camera system that supports the MIPI CSI-2 standard, according to example embodiments of the invention. In this example, a particular use case of the concepts herein described is applied to a front two-camera scenario in a vehicle. However, it is envisaged that in other examples the concepts herein described may apply equally to more or fewer cameras. The MIPI CSI2 visual interface unit comprises a host processor 210 that is configured to be responsible for interfacing the external MIPI CSI2 compliant devices (such as Cameras 410, 412, with the hardware controller 370, other processors and memory components of the camera system). The MIPI CSI2 host processor 210 receives and decodes the video data and writes the data into SRAM memory 300, as described above. Vision processing accelerators/engines, such as the image signal processor(s) 360, subsequently extract(s) this video data from SRAM memory 330 for further pixel processing. In some examples, a further SRAM memory 410 may be used for storing partial images (e.g. lines of images). DDR memory 430 may be used for storing complete images after the processing of an image is complete. A fast direct memory access (DMA) module 420 may be configured to block a transfer of image lines from SRAM 410 to DDR 430, and vice versa. Embedded data in the MIPI frames are also written to a separate fixed block in the system memory and will be processed by software, not by any image processing engines.

Examples of the invention describe two schemes to allow embedded data buffer management based on a software programmable field, e.g. an Auto clear field.

Figure 5:
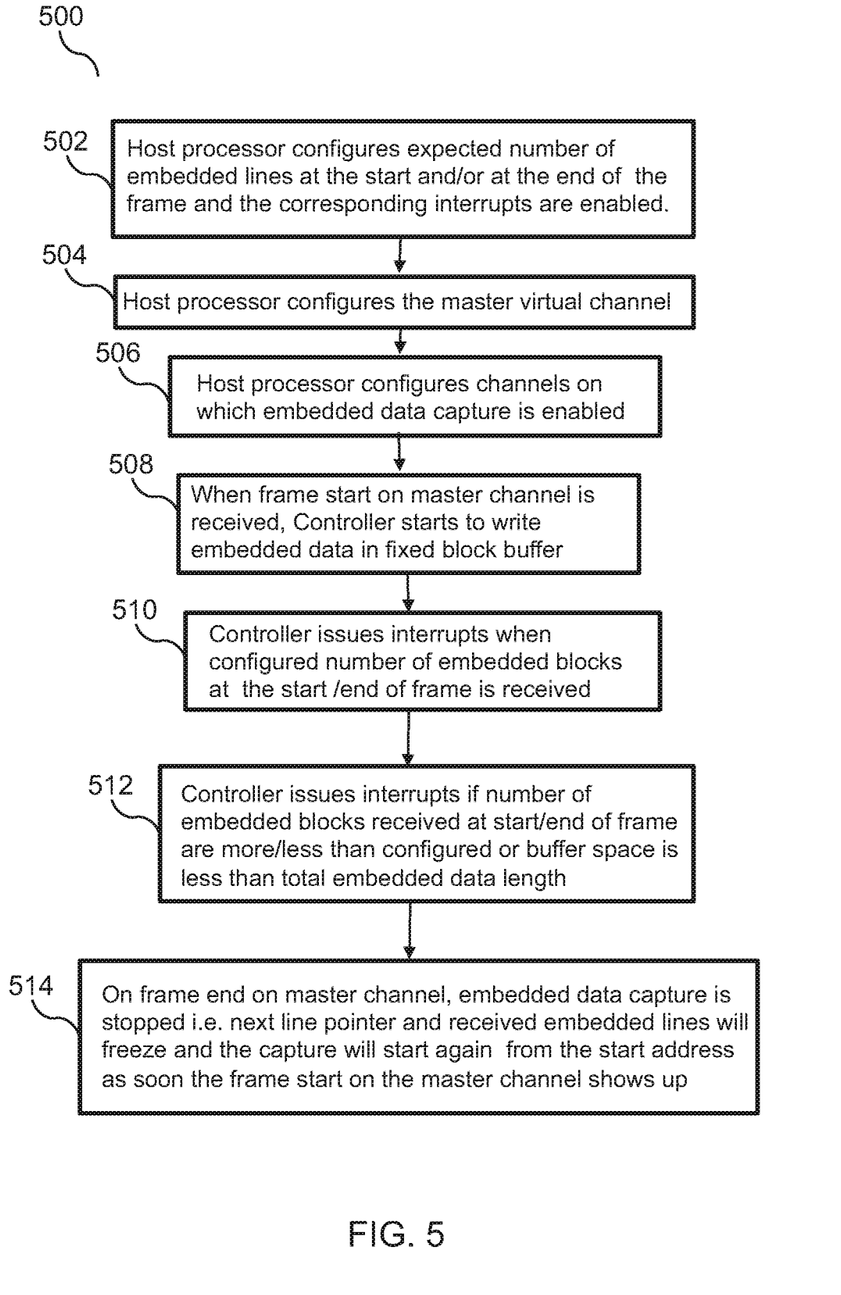
FIG. 5 illustrates a flow chart of a first example embedded data capture and buffer management scheme in a video unit, according to example embodiments of the invention.

Referring now to FIG. 5, a flowchart 500 illustrates a first example of an embedded data capture and buffer management scheme in a video unit, according to example embodiments of the invention. In this example, virtual channel embedded data path may be enabled by a processor, such as host processor 210 from FIG. 3, and never cleared by a controller (such as controller 370 in FIG. 3). In this example flowchart 500, the host processor may configure an expected number of embedded lines at the start and/or at the end of a received video frame and the corresponding interrupts are enabled at 502. The host processor configures the master virtual channel by first segregating video data and embedded data in a received frame, in order to suit their respective processing requirements. Thereafter, at 504, the host processor configures the master virtual channel by for example an expected number of bytes of embedded data within one frame of the master virtual channel. At 506, the host processor is configured to enable the embedded data capture and, for example, configures a start pointer for the fixed buffer in memory.

At 508, when a frame of received data starts on the master channel, the controller 370 may then be configured to write the expected lines of video data into a fixed block buffer in the memory and, in some examples, at 510 the controller may issue any corresponding interrupts when the expected number of embedded data blocks at a start and/or end of frame is received. At 512, the controller may be configured to issue any corresponding interrupts if an unexpected number of embedded data blocks at a start and/or end of frame is received, e.g. the number of embedded data blocks received at start/end of frame is more or less than configured during a reception window or where the available buffer space is less than the total embedded data length. At 514, when a frame end of the master channel occurs, the embedded data capture is stopped. Here, the controller records the next line pointer, the error status bit and a received number of blocks when such an error occurs. These statuses remain frozen until fresh embedded data capture starts again, which recommences from the start address as soon the frame start on the master channel shows up.

Figure 6:
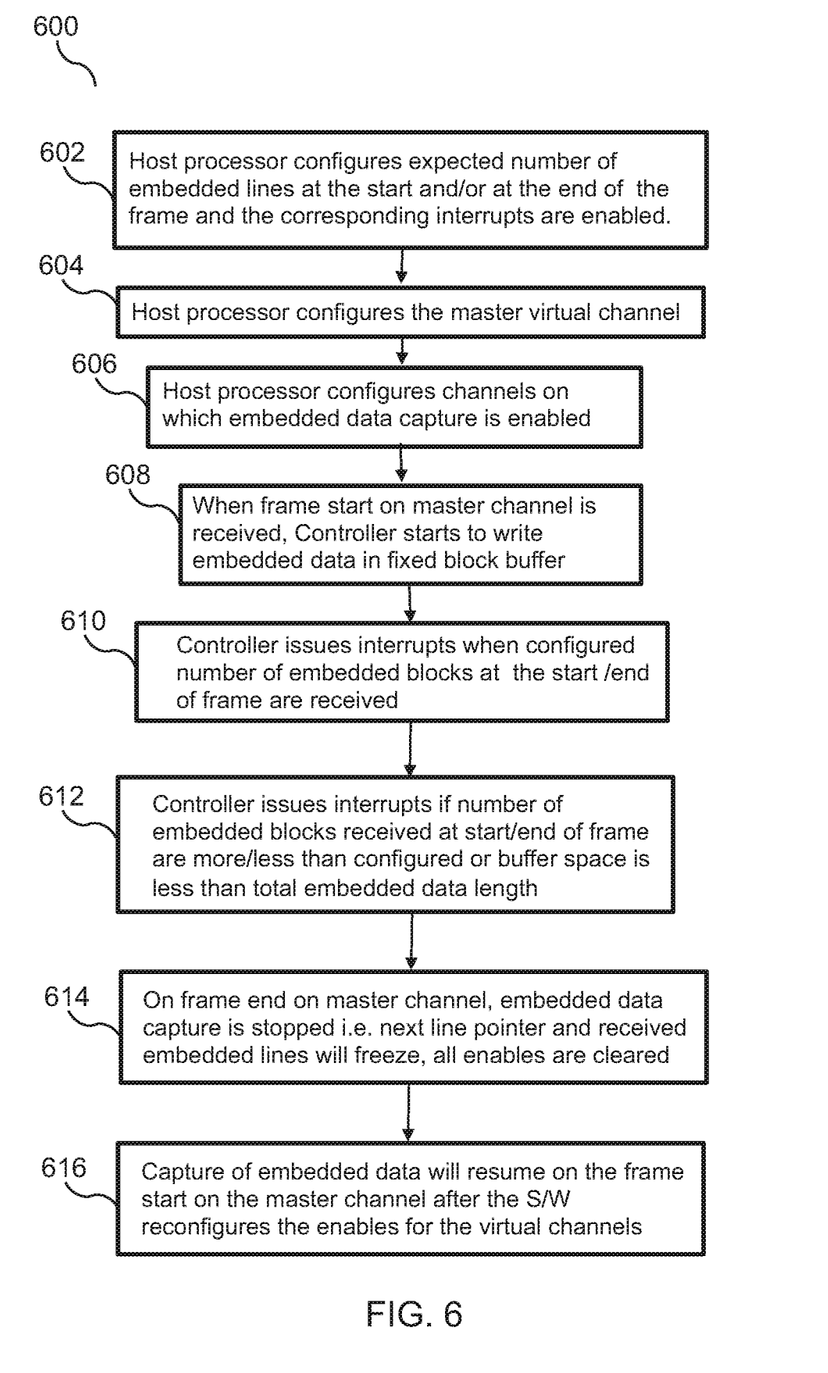
FIG. 6 illustrates a flow chart of a second example embedded data capture and buffer management scheme in a video unit, according to example embodiments of the invention.

Referring now to FIG. 6 a flowchart 600 illustrates a second example embedded data capture and buffer management scheme in a video unit, according to example embodiments of the invention. In this example, virtual channel embedded data path may be enabled by a host processor (such as host processor 210 in FIG. 3) and cleared by the controller (such as controller 370 in FIG. 3). In this example flowchart 600, the host processor may configure an expected number of embedded lines at the start and/or at the end of a received video frame and the corresponding interrupts are enabled at 602. The host processor configures the master virtual channel by first segregating video data and embedded data in a received frame, in order to suit their respective processing requirements. In this context, the processing requirements may vary given that the information that can be embedded in the frame is not fixed. An example could be processing the data and time information of when the frame was captured. Thereafter, at 604, the host processor configures the master virtual channel, for example an expected number of bytes of embedded data within one frame of the master virtual channel. At 606, the host processor configures the channels on which embedded data capture is enabled and, for example, configures a start pointer for the fixed buffer in memory.

At 608, when a frame of received data starts on the master channel, the controller may then be configured to write the expected lines of video data into a fixed block buffer in the memory and, in some examples, at 610 the controller may issue any corresponding interrupts when the expected number of embedded data blocks at a start and/or end of frame is received. At 612, the controller may be configured to issue any corresponding interrupts if an unexpected number of embedded data blocks at a start and/or end of frame is received, e.g. the number of embedded data blocks received at start/end of frame is more or less than configured during a reception window or where the available buffer space is less than the total embedded data length. At 614, when a frame end of the master channel occurs, embedded data capture is stopped. Here, the controller records the next line pointer, the error status bit and a received number of blocks when such an error occurs. Notably in this example, all enables are cleared. At 616, as soon as the host processor enables the embedded data path enable, embedded data capture will start again from the start address, as soon the frame start on the master channel shows up (provided the previous error interrupt has been cleared).

In this manner, any determined mismatch in the expected such data, which could cause erroneous results, may be identified and corrected for. The controller and host processor of the camera system facilitate tracking a number of embedded data blocks at the start and end of a video frame, as well as tracking a number of embedded bytes received. Thereafter, the camera system is able to report errors in cases of a determined difference between received and expected embedded data. Advantageously, the camera system is able to prevent data overwrites in the fixed buffer, as well as provide useful information to the host processor thereby enabling the host processor to take any necessary decision.

Figure 7:
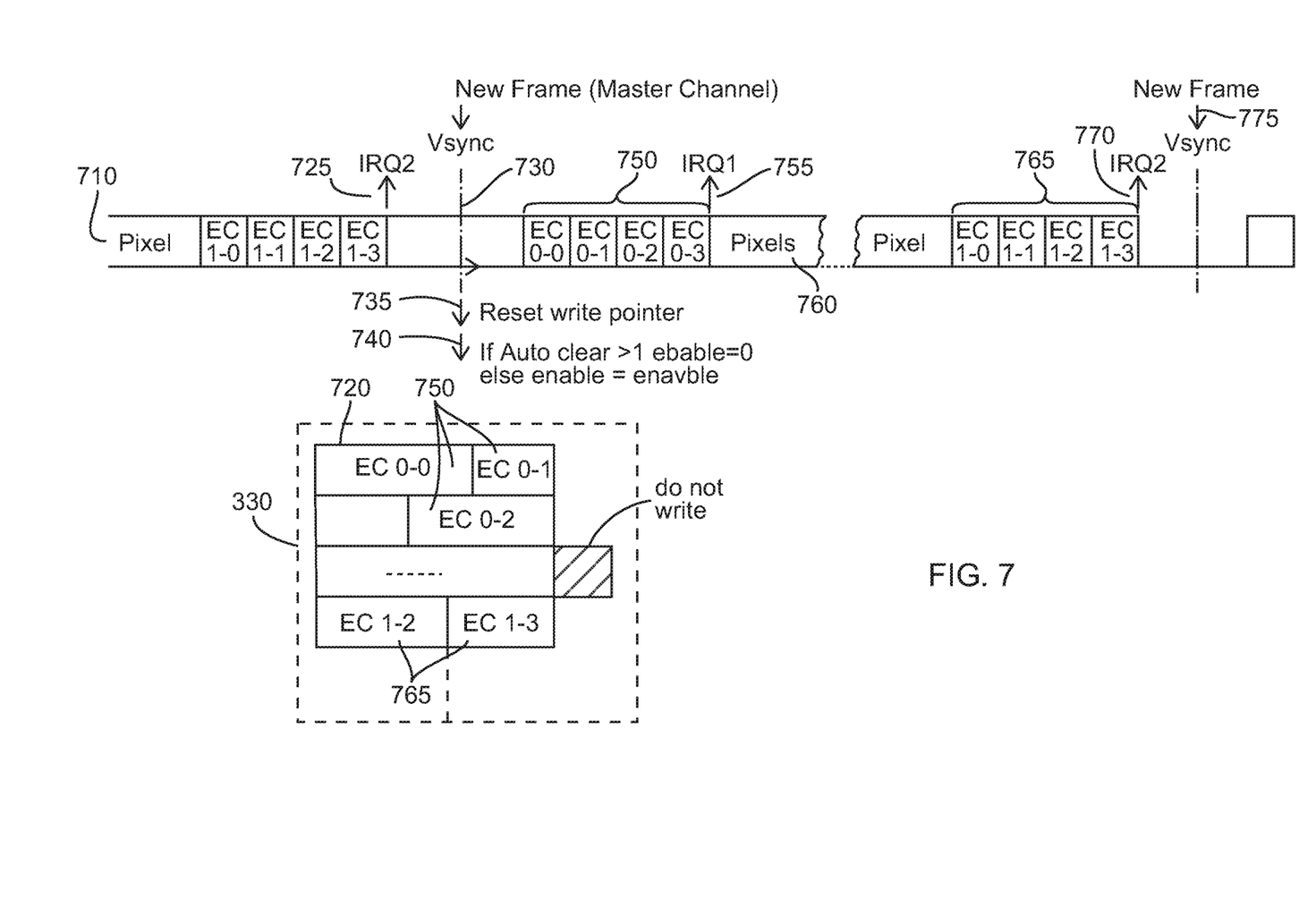
FIG. 7 illustrates a timing and frame structure diagram of an embedded data buffer management scheme in a video unit, according to example embodiments of the invention.

Referring now to FIG. 7, a timing and frame structure diagram 700 illustrates an embedded data buffer management scheme in a video unit, according to example embodiments of the invention. Here, a host processor, such as host processor 210 from FIG. 2 or FIG. 3, is configured to allocate one of the virtual channels as a master channel 710. In accordance with examples of the invention, the host processor 210 is configured to segregate video (pixel) data 760 and embedded data 750, 765 into a received frame, in order to suit their respective processing requirements, as previously mentioned. In some examples, by segregating the video (pixel) data 760 and the embedded data 750, 765, the embedded data capture enable/disable configuration may also be placed under software control by the host processor 210.

As illustrated, embedded data is captured for a programmed number of blocks or error, whichever occurs first. Then, upon a fresh frame start a decision can be made by the software as to whether the fixed block buffer should be overwritten to the same location in memory 330 or the content retained, for example using an auto clear feature. Once the software configuration is complete and the camera system 300 is ready to receive the incoming data, the virtual channel data decoder, such as virtual channel data decoder 320 of FIG. 3, waits for a fresh frame start on the master channel 710 to occur.

In the timing and frame structure diagram 700, the master virtual channel 710 is used to mark a clear boundary from where the embedded data capture on all enabled channels (ECs) should start. When the frame start 730 on the master channel is received, following an interrupt request 725, embedded data capture on all enabled channels starts. A write pointer is reset 735 and the embedded data so captured from all enabled channels is sent 740 to a fixed block buffer 720 in memory 330. When the configured number of embedded blocks are received, or if an error occurs in the capture of the embedded data or more or less than an expected number of embedded data blocks is received or more bytes of embedded data than allocated buffer are received, then further embedded data writing into the fixed block buffer stops.

If software (e.g. the host processor 210) has set an auto clear flag 740, then upon a fresh frame start on the master channel, embedded data in the incoming frame is captured in the fixed block buffer 720 overwriting the previous data. If the auto clear flag 740 is not set, then when the virtual channel data decoder stops writing embedded data to the fixed block buffer 720 the virtual channel data decoder also disables the enabled channels. Software is now required to intervene for fresh data capture. The software (e.g. the host processor 210) also has to re-enable the channels 750 for which embedded data is to be captured. Once such a configuration is performed, embedded data on enabled channels again starts to be captured when a fresh start occurs on the master channel. Pixel data may be included in the enabled channels 765, but it is not mandatory, as per the MIPI standard.

Although examples of the invention are described with reference to use of two cameras and two virtual channels in a video unit, it is envisaged that the concepts herein described will work equally well for more or fewer virtual channels. Although examples of the invention are described with reference to virtual channels in a video data unit, it is envisaged that the invention is applicable for any data being sent over virtual channels.

Thus, in contrast to the teaching in U.S. Pat. No. 7,254,378 B2 of decoding embedded data and other relevant electromagnetic signals utilizing separate decoders to pass the data on directly to the relevant processing module, the design described above deals with embedded data decoding from an incoming (digital) video stream on virtual channels utilizing the same decoder for both embedded data and other relevant electromagnetic signals and aligning the data correctly in memory for further processing. Additionally, the design described above proposes a mechanism to report errors after reception of embedded data.

Furthermore, in contrast to the teaching in U.S. Pat. No. 8,254,470 B2 of encoding and decoding of an embedded digital data stream in an analog video stream using copy protection pulses and where the encoding and decoding is limited to a non-video part of data, the design described above deals with a pure digital stream carrying embedded data, such as video data.

In some examples of the invention, the host processor 210 may also be configured to implement an error reporting and handling process for embedded data capture in a MIPI CSI2 system. In this context, memory 330 may include a set of software-configurable registers whereby the host processor 210 is configured to recognize embedded data blocks expected to be located at a start of a video frame, embedded data blocks expected at and end of the video frame, an understanding of length of the expected embedded data and a capability to initiate an interrupt enable signal to instigate error reporting. In this example, the set of software-configurable (status) registers 380 may be used by the host processor 210 to identify one or more of: a next byte pointer, a total number of embedded data blocks received so far (e.g. based on a number of embedded data blocks it expects at the start and end of each frame on all virtual channels), an embedded error report status, an interrupt status for error situations.

In some examples, the circuits herein described may be implemented using discrete components and circuits, whereas in other examples the circuit may be formed in integrated form in an integrated circuit. Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

A skilled artisan will appreciate that the level of integration of processor circuits or components may be, in some instances, implementation-dependent. Furthermore, a single processor or MCU may be used to implement a processing of virtual channel data capture, including enabling and disabling virtual channels in a video unit. Clearly, the various components within the video unit 300 can be realized in discrete or integrated component form, with an ultimate structure therefore being an application-specific or design selection.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the host processor 210 may be implemented as circuitry located on a single integrated circuit. Here, the host processor circuitry comprises a series of input ports for each of the supported virtual channels. Alternatively, the host processor 210 may be implemented as circuitry located on a single integrated circuit where a single port is used to receive all video data frames and the parsing of individual data channel data may be performed within host processor 210. Alternatively, the circuit and/or component examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to purely video units but may be employed in any dynamically programmable physical device or unit that is able to receive multiple selectable/actionable virtual channels by operating in accordance with suitable program code, such as minicomputers, personal computers, tablets, embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A video device-comprising:
   a host processor comprising at least one input video port configured to receive a plurality of video data signals that comprise video data and embedded data from a plurality of virtual channels in a received frame; and
   a memory operably coupled to the host processor and configured to receive and store video data;
   wherein the host processor is configured to segregate the video data from the embedded data in the received frame and process the embedded data individually, and
   the host processor is configured to determine how many embedded data blocks are to be expected at a start of a frame and expected at an end of the frame based on a number of programmed embedded data blocks for each of the plurality of virtual channels.

2. The video device of claim 1 wherein the host processor is further configured to create a single fixed buffer block for capture of embedded data across multiple virtual channels from the plurality of virtual channels.

3. The video device of claim 1 wherein the host processor is configured to select one of the plurality of virtual channels and program the selected virtual channel to function as a master virtual channel for carrying video data and the number of embedded data blocks.

4. The video device of claim 3 wherein the host processor is configured to decide a frame start position on which each virtual channel would start embedded data capture.

5. The video device of claim 1 wherein the host processor is configured to manage a set of status registers, wherein the set of status registers identify a next pointer indication in the memory for writing embedded data to and use a determined frame start position and a determined frame end position to identify a total number of embedded data blocks received in the received frame.

6. The video device according to claim 1 wherein the memory contains software-configurable registers and the host processor is configured to determine whether or not embedded data is to be overwritten in the software-configurable registers contained in the memory using an embedded auto clear flag.

7. The video device of claim 1 further comprising a controller operably coupled to the host processor wherein the host processor is configured to inform the controller when a received frame contains an expected number of embedded data blocks or when a difference exists between a received number of embedded data blocks and an expected number of embedded data blocks in a received frame.

8. The video device of claim 7 wherein the controller is configured to generate at least one interrupt in response to the host processor identifying a received frame having an expected number of embedded data blocks at the start and/or end of the received frame.

9. The video device of claim 7 wherein the controller is configured to record in memory at least one of: a next line pointer, an error status bit, a received number of blocks, in response to the host processor identifying a received frame having an unexpected number of embedded data blocks at the start and/or end of the received frame.

10. The video device of claim 9 wherein the host processor is configured to select one of the plurality of virtual channels and program the selected virtual channel to function as a master virtual channel for carrying video data and the number of embedded data blocks, and when the at least one of: a next line pointer, an error status bit, a received number of blocks, remain stored in memory until a next embedded data capture process starts on the master virtual channel.

11. The video device of claim 10 wherein when the at least one of: a next line pointer, an error status bit, a received number of blocks, remain stored in memory and all virtual channel enables are cleared until a next embedded data capture process starts on the master virtual channel.

12. The video device of claim 1 wherein the processor is configured to process Mobile Industry Processor Interface (MIPI) Alliance Camera Serial Interface video data.

13. A vehicle comprising a video device that comprises:
   a host processor comprising at least one input video port configured to receive a plurality of video data signals that comprise video data and embedded data from a plurality of virtual channels in a received frame; and
   a memory operably coupled to the host processor and configured to receive and store video data;
   wherein the video device is characterized in that the host processor is configured to segregate the video data from the embedded data in the received frame and process the embedded data individually, and
   the host processor is configured to determine how many embedded data blocks are to be expected at a start of frame and expected at an end of the frame based on a number of programmed embedded data blocks.

14. A method for processing video data in a video device that includes a host processor, the method comprising:
   determining how many embedded data blocks are to be expected at a start of frame and expected at an end of the frame based on a number of programmed embedded data blocks for each of a plurality of virtual channels;

receiving a plurality of video data signals that comprise video data and embedded data from the plurality of virtual channels in a received frame; and storing the video data from the plurality of virtual channels, wherein the method is characterised by:

segregating the video data from the embedded data in the received frame; and processing the segregated embedded data separately.

15. The method of claim 14 further comprising creating a single fixed buffer block for capture of embedded data across multiple virtual channels from the plurality of virtual channels.

16. The method of claim 14 further comprising selecting one of the plurality of virtual channels and program the selected virtual channel to function as a master virtual channel for carrying video data and a number of embedded data blocks.

17. The method of claim 16 further comprising deciding a frame start position on which each virtual channel would start embedded data capture.

18. The method of claim 16 further comprising managing a set of status registers to identify a next pointer indication in the memory for writing embedded data to and use a determined frame start position and a determined frame end position to identify a total number of embedded data blocks received in the received frame.

* * * * *